(12) United States Patent
Gschwind

(10) Patent No.: US 9,430,236 B2
(45) Date of Patent: *Aug. 30, 2016

(54) CODE STACK MANAGEMENT

(71) Applicant: International Business Machines Corporation, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/501,548

(22) Filed: Sep. 30, 2014

(65) Prior Publication Data
US 2015/0121339 A1    Apr. 30, 2015

Related U.S. Application Data

(63) Continuation of application No. 14/067,053, filed on Oct. 30, 2013, now Pat. No. 9,189,214.

(51) Int. Cl.
*G06F 9/44* (2006.01)
*G06F 9/30* (2006.01)

(52) U.S. Cl.
CPC ......... *G06F 9/30134* (2013.01); *G06F 9/4425* (2013.01)

(58) Field of Classification Search
CPC .................... G06F 21/52; G06F 9/30134
USPC .................. 717/101–178; 711/132; 712/202
See application file for complete search history.

(56) References Cited

U.S. PATENT DOCUMENTS

| | | | | |
|---|---|---|---|---|
| 5,220,669 A | * | 6/1993 | Baum | G06F 9/30054 712/233 |
| 5,675,776 A | * | 10/1997 | Duranton | G06F 9/30 712/220 |
| 6,081,665 A | * | 6/2000 | Nilsen | G06F 9/45504 711/E12.011 |

(Continued)

FOREIGN PATENT DOCUMENTS

EP          0915415 A2     6/1999
WO    WO2013078024 A1     5/2013

OTHER PUBLICATIONS

A Program Logic and Its Application in Fully Verified Software Fault Isolation—Lu Zhao—School of Computing, The University of Utah—Aug. 2012.*

(Continued)

*Primary Examiner* — Francisco Aponte
(74) *Attorney, Agent, or Firm* — Cantor Colburn LLP; William A. Kinnaman, Jr.

(57) ABSTRACT

Embodiments relate to code stack management. An aspect includes a processor configured to execute a software application. Another aspect includes a code stack memory area and a data stack memory area, the code stack memory area being separate from the data stack memory area. Another aspect includes maintaining a data stack in the data stack memory area, the data stack comprising a plurality of stack frames comprising one or more data variables corresponding to the execution of the software application. Another aspect includes maintaining a code stack in the code stack memory area, the code stack comprising a plurality of code stack entries comprising executable computer code corresponding to the execution of the software application.

19 Claims, 9 Drawing Sheets

(56) References Cited

U.S. PATENT DOCUMENTS

| | | | | |
|---|---|---|---|---|
| 6,345,353 B2* | 2/2002 | Allen | | 711/219 |
| 6,546,546 B1* | 4/2003 | Van Doorn | | G06F 9/468 |
| | | | | 711/E12.009 |
| 6,578,094 B1 | 6/2003 | Moudgill | | |
| 6,851,108 B1* | 2/2005 | Syme | | G06F 9/44589 |
| | | | | 717/118 |
| 6,948,034 B2* | 9/2005 | Aoki | | G06F 9/4425 |
| | | | | 711/129 |
| 7,228,563 B2 | 6/2007 | Szor | | |
| 7,404,182 B1* | 7/2008 | Garthwaite | | G06F 12/0269 |
| | | | | 707/999.202 |
| 7,594,111 B2 | 9/2009 | Kiriansky et al. | | |
| 7,631,292 B2* | 12/2009 | Chen | | G06F 21/52 |
| | | | | 713/190 |
| 7,752,459 B2 | 7/2010 | Cowan et al. | | |
| 7,784,057 B2* | 8/2010 | Davis | | G06F 9/461 |
| | | | | 711/100 |
| 7,870,541 B1* | 1/2011 | Deshpande | | G06F 9/4425 |
| | | | | 717/124 |
| 8,104,021 B2* | 1/2012 | Erlingsson | | G06F 12/1441 |
| | | | | 717/126 |
| 9,098,704 B2* | 8/2015 | Ledenev | | G06F 21/566 |
| 2004/0250105 A1 | 12/2004 | Molnar | | |
| 2005/0166036 A1* | 7/2005 | Catherwood | | G06F 9/30145 |
| | | | | 712/34 |
| 2007/0180524 A1* | 8/2007 | Choi | | G06F 21/52 |
| | | | | 726/23 |
| 2008/0052468 A1* | 2/2008 | Speirs | | G06F 13/4059 |
| | | | | 711/132 |
| 2008/0163359 A1 | 7/2008 | Conti | | |
| 2009/0063801 A1* | 3/2009 | Genty | | G06F 12/1466 |
| | | | | 711/163 |
| 2011/0047533 A1* | 2/2011 | Gschwind | | G06F 8/447 |
| | | | | 717/140 |
| 2011/0289586 A1 | 11/2011 | Kc et al. | | |
| 2011/0314452 A1* | 12/2011 | Tillmann | | G06F 9/45516 |
| | | | | 717/128 |
| 2013/0086550 A1* | 4/2013 | Epstein | | G06F 12/1475 |
| | | | | 717/110 |
| 2013/0132690 A1* | 5/2013 | Epstein | | G06F 12/145 |
| | | | | 711/159 |
| 2013/0185792 A1* | 7/2013 | Balakrishnan | | G06F 21/54 |
| | | | | 726/22 |
| 2013/0276056 A1* | 10/2013 | Epstein | | G06F 21/604 |
| | | | | 726/1 |

OTHER PUBLICATIONS

Tail Call Optimization in the Java HotSpot TM VM—Arnold Schwaighofer—Johannes Kepler Universitat Linz—2009.*

Notification and Transmittal of The International Search Report and the Written Opinion of the International Searching Authority or the Declaration for International Application No. PCT/CN2014/087688 Filing Date Sep. 28, 2014; Date of Mailing Dec. 26, 2014; 12 pages.

* cited by examiner

CODE STACK MANAGEMENT

CROSS-REFERENCE TO RELATED APPLICATION

This application is a continuation of U.S. application Ser. No. 14/067,053 (Gschwind), filed on Oct. 30, 2013, which is now U.S. Pat. No. 9,189,214 issued on Nov. 17, 2015, which is herein incorporated by reference in its entirety.

BACKGROUND

The present invention relates generally to computer systems, and more specifically, to management of a code stack during execution of a computer program.

Computer systems typically comprise a combination of computer programs and hardware, such as semiconductors, transistors, chips, circuit boards, storage devices, and processors. The storage devices store data and the computer programs, which are executed by the processors.

The computer programs are often divided into pieces, which call or invoke each other. The pieces are typically referred to as methods, functions, modules, parts, classes, procedures, or subroutines. When a first method (the caller) calls or invokes a second method (the callee), the caller method stops executing and the callee method gains control of the processor and begins executing. When the callee method stops executing, it returns control of the processor to the caller method, which resumes execution at the next instruction following the call instruction that invoked the callee method.

In order to facilitate this call and return technique, computers may use a call stack, which is also known as a run-time stack, a function stack, an execution stack, an invocation stack, or simply a stack. The call stack comprises entries (also known as frames) for each active method. An entry stores information about the execution of its respective method. The information may comprise any, some, or all of identifiers of the method, the return address of the method (the location of the instruction in the caller method to execute next after the callee method returns), the values of local variables read or written by the method, parameters passed to the method, an evaluation stack of operands for arithmetic or logical operations, a pointer to the current instance of the method, the enclosing method context, and/or the privilege or authority level of the method.

The call stacks use the principle of Last In First Out (LIFO), meaning that the last (or most recent) entry added (pushed) to the top of the call stack is the first (or next) item that is removed (popped) from the top of the call stack. For example, in response to a first method invoking a second method, a new entry is created to save the context for the first method and hold the local variables of the second method and pushed to the top of the call stack. If the second method calls a third method, a new entry to save the context for the second method and hold the local variables of the second method is pushed onto the call stack. Once a currently executing method ends, the entry of its caller method is popped from the top of the stack and used to restore the operating environment of the caller method. Since many methods may call each other and calls may be nested or even recursive, the call stack grows and shrinks as the program executes.

In a computer program, a nested function (also referred to as a nested procedure or nested subroutine) is a function which is lexically encapsulated within another function, referred to as the current function. Nested functions are used in many approaches to structured programming. Due to nesting, the scope of the nested function is inside the current function of the nested function. This means that the nested function can access local variables and other local functions, as well as local constants and types, in the current function that are invisible outside the current function. Nesting is theoretically possible to any level of depth, although only a few levels are normally used in practical programs. In some environments, code for nested functions is generated dynamically, and persists up to the exit from a current function and its subroutines. Examples of such dynamically generated code are trampolines and signal handlers. An operating system may allocate this dynamically generated code on the call stack.

SUMMARY

Embodiments include a method and computer program product for code stack management. An aspect includes a processor configured to execute a software application. Another aspect includes a code stack memory area and a data stack memory area, the code stack memory area being separate from the data stack memory area. Another aspect includes maintaining a data stack in the data stack memory area, the data stack comprising a plurality of stack frames comprising one or more data variables corresponding to the execution of the software application. Another aspect includes maintaining a code stack in the code stack memory area, the code stack comprising a plurality of code stack entries comprising executable computer code corresponding to the execution of the software application.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of code stack management are provided, with exemplary embodiments being discussed below in detail. Allocation of dynamically generated code onto a call stack may open a computer system to security attacks, such as stack overflow scenarios. In order to improve security, two separate and distinct stacks comprising a data stack and a code stack are maintained in the computer memory. The data stack may be located in a writeable, non-executable memory area, while the code stack may be located in an executable memory area. In some embodiments, the code stack may be made non-writeable except during allocation of new entries onto the code stack, and may further be made non-executable during allocation of new entries onto the code stack. Security attacks on applications are therefore prevented by the non-executable data stack and separate code stack. The separated code stack and data stack allow dynamically generated code to support trampolines for, for example, event handlers and lexical nesting, while enhancing security.

Trampolines may be allocated on the code stack. A trampoline is a small piece of code that is created at run time when the address of a nested function is taken. The instructions in the trampoline must do two things: load a constant address into a static chain register, and jump to the real address of a nested function. This may require two instructions: a move immediate and a jump. The two addresses may exist in the trampoline as word-long immediate operands. It may be necessary to load each address into a register in two parts; the pieces of each address form separate immediate operands.

The code generated to initialize a trampoline must store the static chain value and the function address into the immediate operands of the instructions. The static chain and function entry address may be stored in a separate data area that is located outside of the code stack. The data area may optionally also containing code stack management information such as used for allocating and deallocating code stack entries, such as a code stack frame allocation size and an associated data stack frame. In some embodiments, trampolines are immutable after having been allocated, and are configured to be used in in conjunction with a pointer to a nested function occurs by writing the separate data area. The data area does not contain writable code, thereby avoiding the risk of code injection into a writable, executable trampoline.

Figure 1:
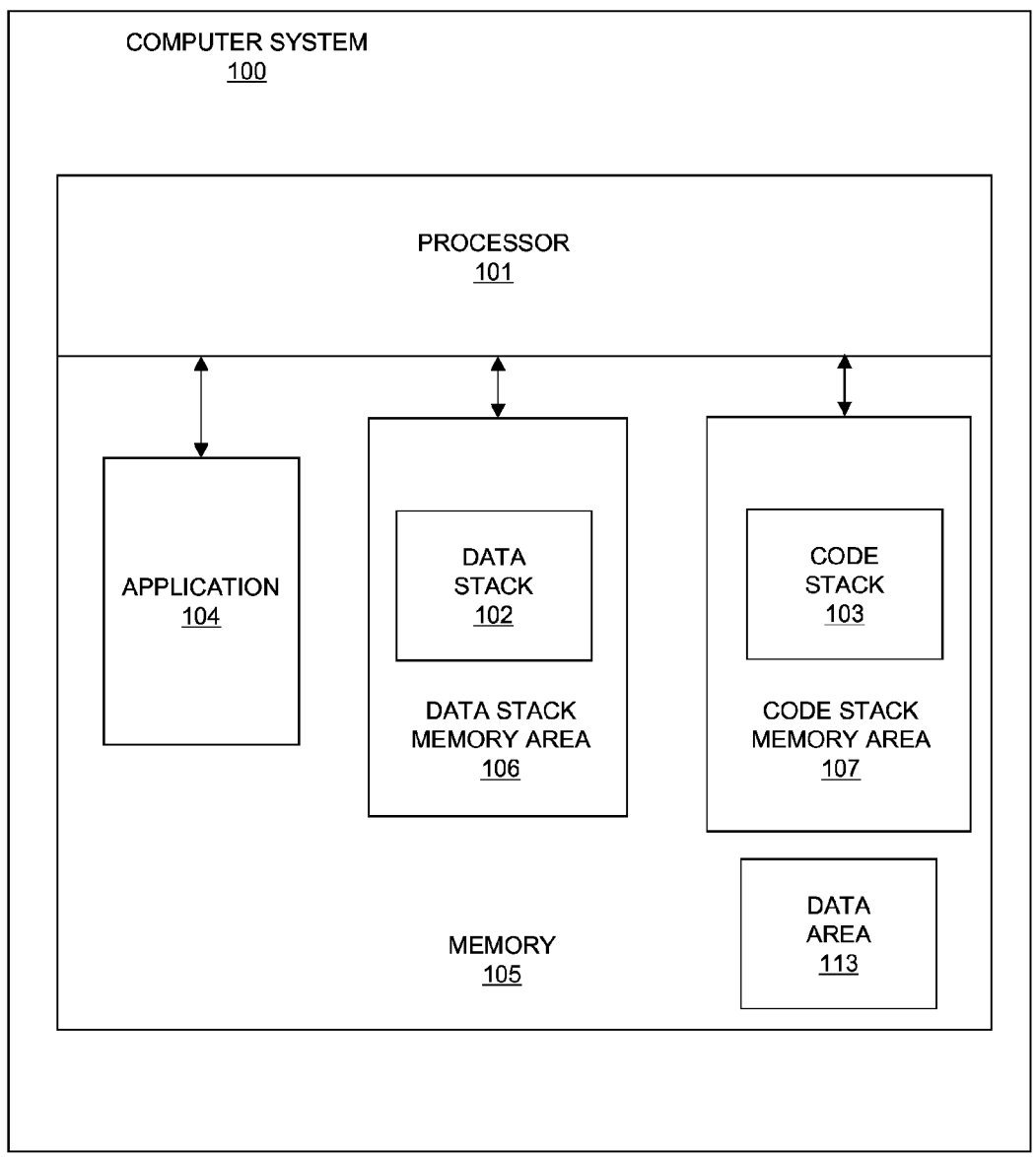
FIG. 1 depicts a computer system for code stack management in accordance with an embodiment.

FIG. 1 illustrates an embodiment of a computer system 100 for code stack management. Computer system 100 includes a processor 101 that executes a software application 104, which comprises executable computer code that is stored in a memory 105 of the computer system 100. During execution of the application 104, the processor 101 manages a data stack 102 and a code stack 103. Data stack 102 is located within a data stack memory area 106 in memory 105, which comprises a writeable, non-executable memory area. Code stack 103 is located within a code stack memory area 107 in memory 105. Code stack memory area 107 comprises an executable memory area. Data stack memory area 106 is separate and distinct from, and non-overlapping with, code stack memory area 107. In some embodiments, the code stack memory area 107 may be non-writeable except during allocation of entries onto code stack 103; in further embodiments, during allocation of entries onto code stack 103, the code stack memory area 107 may be made temporarily non-executable during allocation of entries onto code stack 103. In some embodiments, the code stack memory area 107 may be writeable exclusively by a trusted component of the computer system 100, such as a kernel, or another system component, which may include, but is not limited to, a trusted library, managed runtime environment, or a hypervisor system.

In some embodiments, allocation of entries for nested functions on code stack 103 may be performed by prepopulating a memory page with dynamically generated trampolines. In another embodiment, one or more entries may be allocated onto the code stack 103 corresponding to the trampolines by making the code stack memory area 107 temporarily writable. After the code stack entries corresponding to the prepopulated trampolines are allocated on the code stack 103, the code stack memory area 107 is set to executable and non-writable. In embodiments in which code stack memory area 107 is non-executable during allocation of entries corresponding to the trampolines on the code stack 103, recovery code may be provided for use by any other threads in the application 104 that are concurrently executing. Data for entries corresponding to trampolines in the code stack 103, such as static chain and function address data, may be stored in separate data areas in memory 105, such as a data area 113; this is discussed in further detail below with respect to Tables 1A-B and FIG. 6.

In some embodiments, one or more memory pages having restricted permissions, such as a combination of no read, no write and no-execute permissions, are located immediately before and/or after the code stack memory area 107 in memory 105 to prevent any accidental reference, overflow, or underflow from reaching the code stack memory area 107 by, for example, overflowing or underflowing of a buffer located near the code stack memory area 107 area. One or more guard pages may also optionally be located above and below the code stack 103 in code stack memory area 107 for further protection of the code stack 103.

Each code stack entry may have a respective stack frame in data stack 102, and corresponds to the stack frame which allocated the code stack entry. The stack frames may be automatically allocated and deallocated by processor 101, and may hold any appropriate variables. The code stack memory area 107 may be located relatively far away in the memory map of computer system 100 from the data stack memory area 106 in order to avoid accidental or malicious writes to the code stack memory area 107.

An example of trampoline code is shown in Table 1A. In some embodiments, trampoline code such as is shown in Table 1A may be inserted in multiple entries in the code stack 103, and each of these entries in the code stack 103 may have a corresponding respective data area such as data area 113 specifying a unique respective function address and static chain for each trampoline in the code stack 103.

TABLE 1A

Example Trampoline code

| | | |
|---|---|---|
| .type | trampoline_initial,@object | |
| .align | 2 | |
| trampoline_initial: | | |
| mflr | r0 | |
| bl | .+4 | |
| mflr | r11 | |
| mtlr | r0 | |
| ld | r12,8192(r11) | /* function address */ |
| ld | r11,8200(r11) | /* static chain */ |
| mtctr | r12 | |
| bctr | | |

Referring to the code of Table 1A, execution starts at the location indicated by the label "trampoline_initial" with the instruction "mflr r0" adapted to read the link register containing a return value for the called function into a register r0. Instruction "bl .+4" is adapted at generating a value of a next instruction typically to be used as return address, and transfers control to the next instruction as indicated by the notation ".+4" indicating the current address plus 4 bytes. Instruction "mflr r11" loads this address from the link register lr into register r11 to serve as an addressing reference later. Instruction "mtlr r0" restored the return address previously loaded into r0 into the link register lr. The instruction "ld r12,8192(r11)" uses register r11 as addressing base and adds an offset of 8192 to compute the address of an associated data area located at an offset of 2*4 KB (i.e., two pages from the executing code for this trampoline) to load an address which will be used as function address to which to pass control. The instruction "ld r11,8200(r11)" loads a value from the data area associated to register r11 which is used as a static chain value. The instruction "mtctr r12" loads the starting address of the function containing the programmatic code corresponding to the nbested function into the ctr (count register) and the instruction "bctr" branches to the value in the ctr, i.e., passes control to the compiled function.

In some embodiments, heterogeneous code is used in the code stack 103, and each code stack entry has a separate and distinct size. In other embodiments, the code stack entries that each comprise a homogeneous trampoline, so that configuration of the trampolines may be performed by setting up each trampoline's associated data area 113, and obviating the need to track trampolines sizes. If a number of different code sequences are needed, multiple homogenous code stacks, each corresponding to a different code sequence, may be maintained in memory 105 in some embodiments. In embodiments in which code stack 103 comprises a homogenous code stack, when an entry for a new trampoline is allocated onto code stack 103, no write to the allocated code stack entry needs to be performed because the trampoline already exists in a code stack memory area 107 which has been initialized to hold the fixed code sequence. The preexisting trampoline makes reference to a data area 113 in a separate data section of memory 105 associated with the code stack entry. Therefore, when a new function pointer to a nested function is created, the allocation of the code stack entry comprises initializing the data, such as a function address and static chain, associated with a trampoline in data area 113. This is discussed in further detail below with respect to FIG. 6.

In some embodiments, a code stack 103 of prepopulated trampolines is associated with data regions, such as data area 113, that are located at a fixed offset from each trampoline in memory 105. In some embodiments, the offset is the same for all trampolines; such an embodiment is illustrated in Table 1A, in which each data area 113 associated with a code stack entry in code stack 103 from starts at 8192 bytes from the address loaded by the bl .+4 instruction that loads the value of one of an instruction address, a current instruction address, and a next instruction address. In some embodiments, the data area 113 associated with a code stack entry holds information necessary to initialize the execution environment for the nested function when invoked via a function pointer to a nested function making reference to a trampoline stored in the code stack. In some embodiments, the function pointer is created by loading a nested function pointer environment, such as for example the static chain pointing to an environment containing a nested function's pointing to the dynamic instance of that nested function's static scope which is stored at an offset of 8200 (corresponding to two 4 KB pages plus 8 bytes) from the value loaded by bl .+4. In addition, a nested function is associated with the entry address of function for which it sets up the environment, that entry point being located at 8192 (corresponding to two 4 KB pages) from the value loaded by bl .+4, i.e., at the double word preceding the static chain.

In some embodiments, associating trampoline code with a data area 113 containing additional configuration logic is performed by allocation of a fixed size data area at a defined (static) offset distance from the code stack entry containing the trampoline code. However, when the size of the code stack exceeds the offset, a limit of further expansion is reached, because further expansion would required a data area 113 to overlap a previously allocated code stack entry. In some embodiments, this distance may be changed as needed and at least one of a code stack entry and data area are moved when the offset is changed, further updating all offsets of a trampoline, as shown in Table 1A, which corresponds to the offsets 8192 and 8200. In some embodiments, a data area 113 may be moved, and the code stack entry is not moved because moving the code requires updates to all pointers to the code stored in code stack entries.

In other embodiments, the correspondence between a code stack entry and a data area is not made via a fixed offset, but via a logical association. For example, the $i^{th}$ code stack entry starting at address cb−i*cs, where cb is the code stack base address, i.e., the initial value of a code stack pointer (CSP) for an empty code stack, i is the $i^{th}$ stack frame that has been allocated, and cs is the predefined code size of a fixed code of a code stack, may be associated with the $i^{th}$ associated data area at a data address db−i*ds, where db is the data base address, i.e., the beginning, end, or other corresponding address of the first data area 113 associated with the first code stack entry, i is the $i^{th}$ data area 113 that has been allocated, and ds is the predefined size of a data area 113. When ds is relatively small, (db−cb)/ds stack frames can be allocated before the data area 113 or code stack entry of the code stack needs to be moved. In Table 1B below, an example of trampoline code is shown in which the offset is computed using functional correspondence, where each offset is computed for each entry such that offset=i*(ds+cs)+(ds−cs)+adjustment.

TABLE 1B

Example Trampoline Code

| .type | trampoline_initial,@object |
|---|---|
| .align | 2 |
| trampoline_initial: | |
| mflr | r0 |
| bl | .+4 |
| mflr | r11 |
| mtlr | r0 |
| ld | r12, offset (r11)  /* function address */ |
| ld | r11, offset+8(r11)  /* static chain */ |
| mtctr | r12 |
| bctr | |

In another embodiment, in order to avoid moving of data areas due to collision of the code stack entries and data areas, the code stack grows in one direction, and the data area in another direction, e.g., code stack entries are allocated at decreasing addresses (cb−i*cs) and associated data areas 113 are allocated at increasing addresses (db+i*ds). In some embodiments, db=cb. In some embodiments, additional environment information, such as debugging and unwind information, is also located in the data area 113 associated with each code stack entry to enable debugging and exception handling.

Figure 2A:
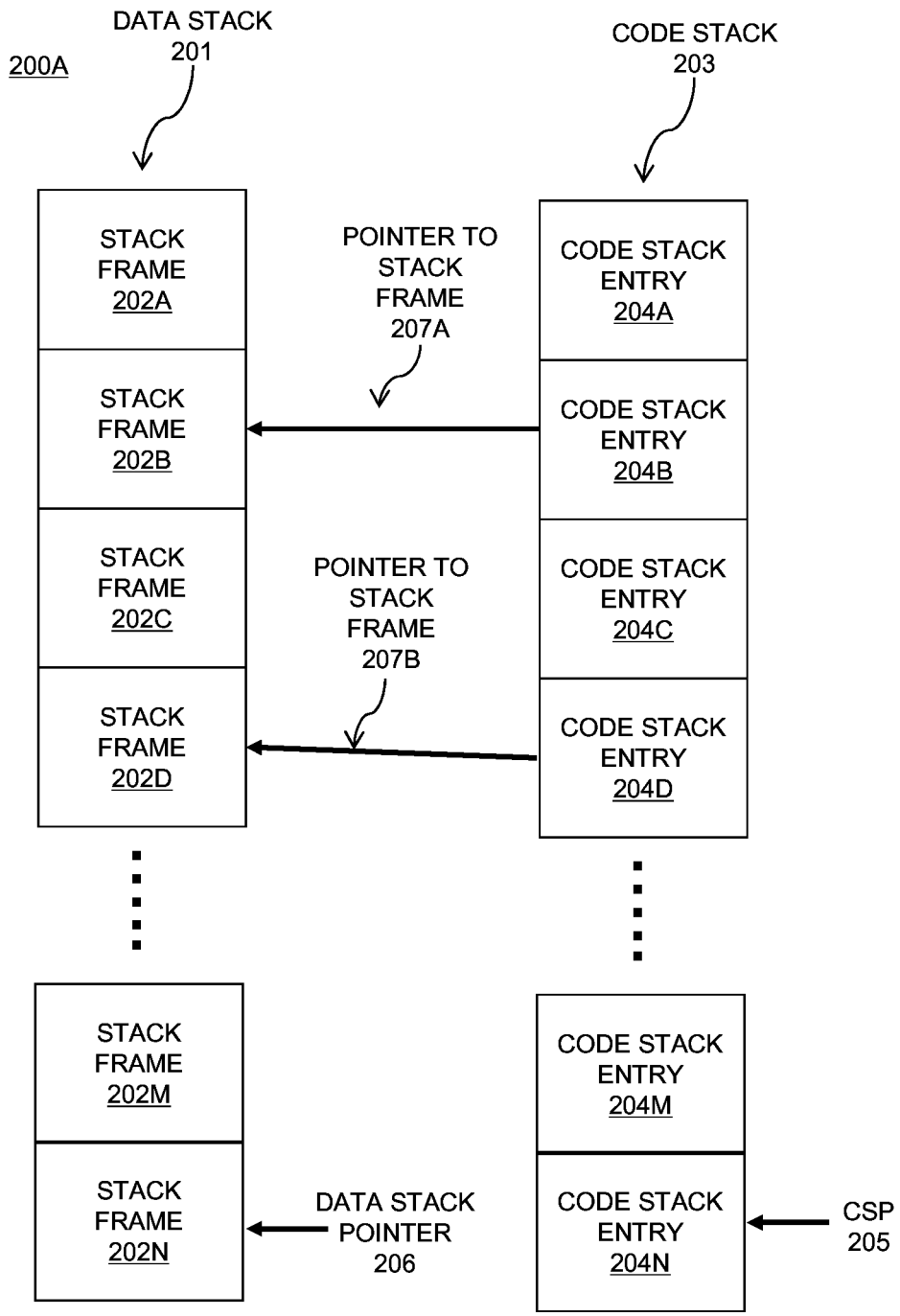
FIGS. 2A-C depict embodiments of a data stack and a code stack.
Figure 2B:
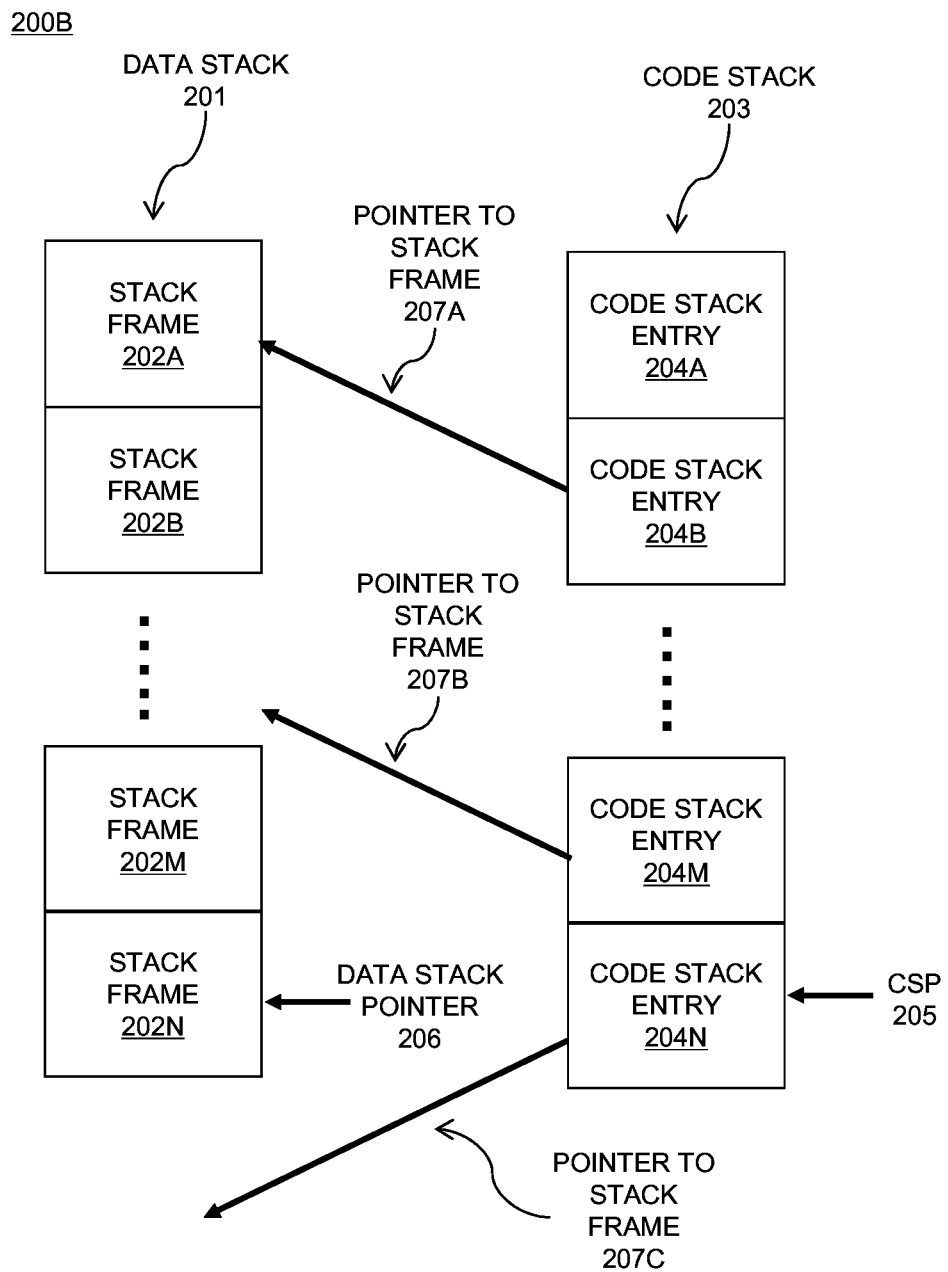
Figure 2C:
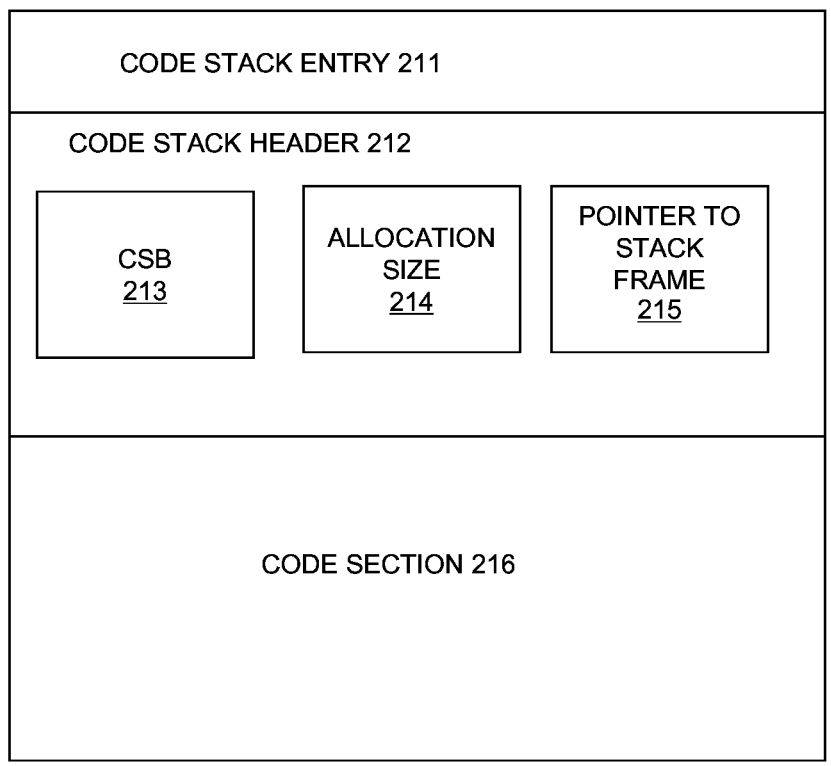

FIGS. 2A-C illustrate embodiments 200A-C of a data stack and a code stack. FIGS. 2A and 2B show a data stack 201, which corresponds to data stack 102 of FIG. 1, and code stack 203, which corresponds to code stack 103 of FIG. 1. The data stack 201 comprises a plurality of stack frames 202A-N. Each stack frame of stack frames 202A-N holds one or more variables corresponding to a function of the application 104. The stack frames 202A-N in data stack 201 are automatically managed by the processor 101; i.e. stack frames 202A-N in code stack 203 are automatically allocated and deallocated as needed by application 104, responsive to code that is executed by application 104. Code stack 203 comprises a plurality of code stack entries 204A-N, containing, for example, trampoline code, or other dynamically generated code that may be managed in a LIFO manner. In some embodiments, each code stack entry in code stack 203 contains a pointer to an associated stack frame in data stack 201 (e.g., stored in the data area 113 corresponding to the code stack entry and indicating the stack frame of the function that created the code stack entry); as shown in FIG. 2A, code stack entry 204B comprises a pointer 207A to an associated stack frame that references stack frame 202B, and code stack entry 204D comprises pointer 207B to an associated stack frame that references stack frame 202D. Data stack pointer 206 references the most recent entry (e.g., stack frame 202N) in data stack 201, and is used for management of data stack 201. CSP 205 references the most recent entry (e.g., code stack entry 204N) in code stack 203, and is used for management of code stack 203. FIG. 2B shows an embodiment 200B of a code stack 203 including a code stack entry 204N having pointer 207C to an associated stack frame that does not point to a valid stack frame 202N in data stack 201; FIG. 2B is discussed in further detail below with respect to FIG. 3. FIGS. 2A-B are shown for illustrative purposes only; a data stack 201 and code stack 203 may each comprise any appropriate number of entries. Further, while data stack 201 and code stack 203 are shown growing downwards in FIGS. 2A-B, a data stack 201 and code stack 203 may each grow in any appropriate direction in memory 105.

FIG. 2C show embodiments of information associated with stack frames 202A-N and code stack entries 204A-N. A stack frame 210, which corresponds to a stack frame of stack frames 202A-N, includes a plurality of example data variables, VAR1-VAR3. These variables may comprise any appropriate variables of any type, and there may be any appropriate number of variables in a stack frame 210. Each code stack entry of code stack entries 204A-N may comprise a code stack entry 211 have an associated code stack header 212 as shown in FIG. 2C. In some embodiments, the code stack header 212 includes a code stack barrier (CSB) 213. Code stack header 212 further comprises a pointer 215 to an associated stack frame such as stack frame 210 that is associated with the code stack entry 211. A code stack header 212 may, in various embodiments, be located within the code stack header's respective code stack entry 211 in the code stack 203 as shown in FIG. 2C, or, in other embodiments, may be a separate data structure located outside of the code stack 203, e.g., in data area 113. In some embodiments, the CSB 213 may be maintained in a separate register or as a variable in a stack frame 210. Code stack entry 211 further comprises code section 216. Code section 216 comprises executable computer code; in some embodiments, code section 216 comprises trampoline code corresponding to a function pointer to a nested function. In some embodiments, the trampoline code may initialize the environment for a statically nested function by loading a static chain into a register, and then passing control to a function that is located outside of the code stack 203.

Figure 3:
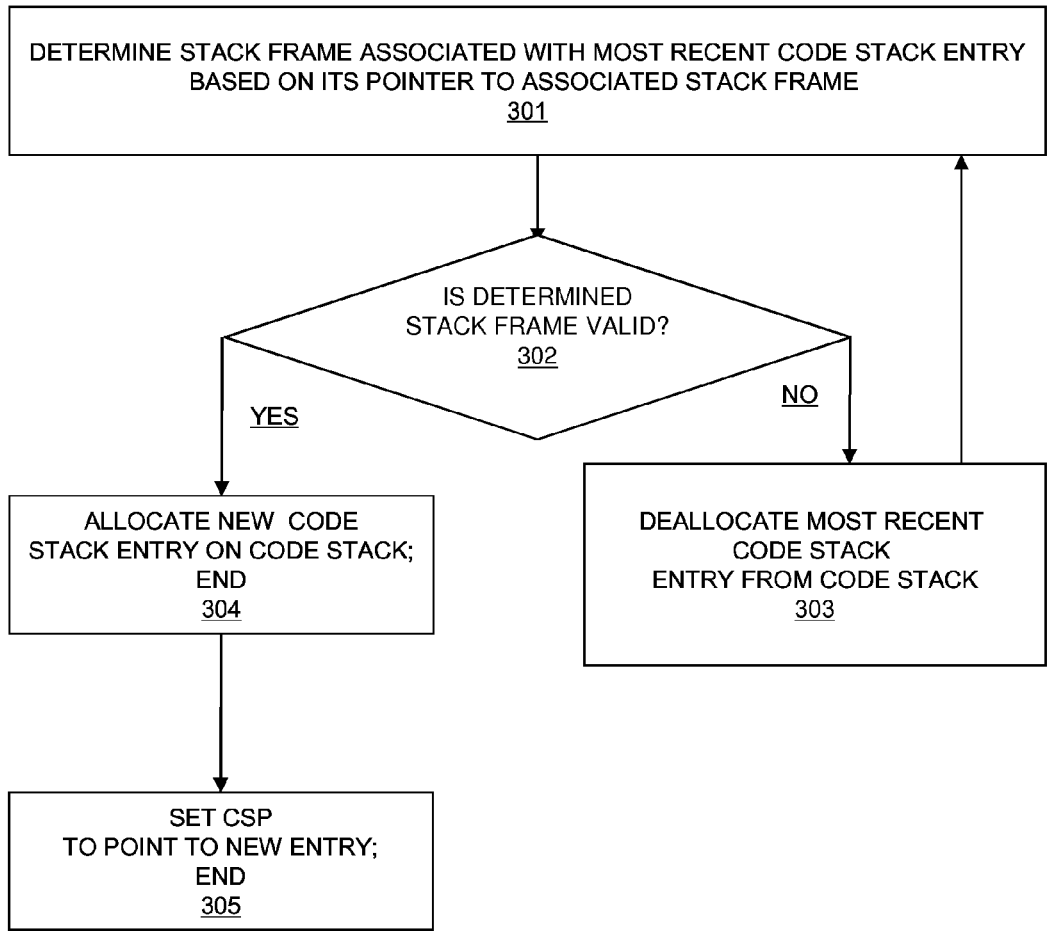
FIG. 3 depicts a process flow for code stack management comprising synchronizing a code stack with a data stack in accordance with an embodiment.

Stack frames 202A-N in data stack 201 may be managed (i.e., allocated and deallocated) automatically by processor 101. In some embodiments, management of code stack entries 204A-N in code stack 203 may be performed as described below with respect to method 300 for code stack synchronization that is illustrated in FIG. 3. Before a new code stack entry is allocated on the code stack 203, method 300 may be performed to remove any invalid entries from the code stack 203. First, in block 301 of FIG. 3, for the most recent code stack entry (for example, code stack entry 204N of FIG. 2B), the pointer to the associated stack frame (for example, pointer 207C, which points to a deallocated, or invalid, stack frame, as shown in FIG. 2B) is retrieved. The most recent code stack entry in the code stack 203 is the code stack entry that is pointed to by the CSP 205. Next, in block 302, it is determined whether the retrieved pointer to the associated stack frame points to a valid stack frame in the data stack 201. This may be determined by comparing the pointer to the associated stack frame that was retrieved in block 301 to the data stack pointer 206. In an embodiment in which the data stack 201 and the code stack 203 grow downward, if the pointer to the associated stack frame has a value that is less than the value of the data stack pointer 206, it is determined in block 302 that the pointer to the associated stack frame does not point to a valid entry in the data stack 201. For example, as shown in FIG. 2B, the pointer 207C to the stack frame associated with code stack entry 204N does not point to a valid entry in data stack 201, because pointer 207C to the associated stack frame points to a memory area located below (i.e., that is less than) data stack pointer 206. If it is determined in block 302 that the pointer to the associated stack frame does not point to a valid stack frame in the data stack 201, flow proceeds from block 302 to block 303, in which the most recent entry in the code stack is deallocated from the code stack 203. This may be performed by moving the CSP 205 up one entry in the code stack 203. For example, in block 303, as shown in FIG. 2B, CSP 205 is moved up to point to code stack entry 204M, and code stack entry 204N is deallocated. From block 303 flow then returns to block 301, and method 300 repeats until it is determined in block 302 that that the pointer to the associated stack frame associated with the most recent code stack entry in code stack 203 points to a valid stack frame in the data stack 201, at which point flow proceeds from block 302 to block 304. In block 304, a new code stack entry is allocated on the code stack 203. Lastly, in block 305, CSP 205 is set to point to the new code stack entry that was allocated in block 304, and method 300 ends.

An example of allocation of a new code stack entry is shown below with respect to Table 2, and an example of deallocation from the code stack of code stack entries that point to invalid entries in the data stack (as discussed above with respect to FIG. 3) is shown below with respect to Table 3.

TABLE 2

Allocation Example

```
void *code_sp;
int csp_frame_idx = 0;
struct csp_frame_struct
    { int size;
      void* data_sp; } csp_frame[MAX];
void *
allocate(void *data_sp, int memory_size)
{
    reclaim(data_sp);
    code_sp -= memory_size;
    csp_frame_idx++;
    csp_frame[csp_frame_idx].size = memory_size;
    csp_frame[csp_frame_idx].data_sp = data_sp;
    return code_sp;
}
```

TABLE 3

Deallocation Example

```
reclaim(void *data_sp)
{
    while (csp_frame[csp_frame_idx].data_sp < data_sp){
        code_sp += csp_frame[csp_frame_idx].size;
        csp_frame_idx --;
    }
}
```

While the code shown in Tables 2-3 uses a distinct tracking structure csp_frame[MAX] associated with each frame pointer that is allocated in a memory area and processed in conjunction with a separate index csp_frame_index, where a first index corresponds to the first allocated code stack entry, and the second index to the second allocated code stack entry, and so forth, other organization forms may be used in conjunction with embodiments of code stack management in various embodiments. In some embodiments, the code stack entry size is fixed and not stored in conjunction with the frame information. In some embodiments, the code stack entry information is stored as part of, or in conjunction with, the data area 113 associated to a code stack entry when a separate data area 113 is present. In some embodiments, the code stack entry information is stored as part of, or in conjunction with, the code stack entry whether a separate data area 113 is or is not present.

In further embodiments, code stack management may be performed by allocation and deallocation of code stack entries according to either of methods 400-500, which are discussed below with respect to FIGS. 4-5. In methods 400-500 of FIGS. 4-5, a code stack entry may be explicitly removed from the code stack 103/203 when the function that allocated the code stack entry exits. In embodiments of a code stack maintains trampoline code corresponding to a function pointer to a nested function, the trampoline code may initialize the environment for a statically nested function by loading a static chain into a register, and then passing control to a function that is located outside of the code stack 203. The trampoline code is deallocated when the current function that created the function pointer for the nested function exits.

The discussion below of FIGS. 4-5 assumes that the code stack 103/203 and data stack 101/201 grow downward in memory 105; however, this is for illustrative purposes only. In some embodiments, the code stack 103/203 and data stack 101/201 may grow upwards; in such embodiments, appropriate adjustments may be made, such as, for example, replacing a less than (<) comparison with a greater than (>) comparison, or replacing a minus (−) operation with a plus (+) operation. In still further embodiments, the code stack 103/203 may grow upwards, and the data stack 101/201 may grow downwards; or the code stack 103/203 may grow downwards, and the data stack 101/201 may grow upwards.

During methods 400-500, in some embodiments, the code stack memory area 107 is writeable only while code stack entries are currently being allocated or deallocated in code stack 103/203. In further embodiments, the code stack memory area 107 is only writeable by a secure trusted system component of the computer system 100, e.g., a kernel, a trusted library, managed runtime environment, or a hypervisor. Code may be allocated onto code stack 103/203 by prepopulating memory pages corresponding to the code stack memory area 107 with dynamically generated trampolines in some embodiments. In another embodiment, the code corresponding to dynamically generated trampolines is generated in a separate non-executable, writeable area and the trusted component may then allocate code stack entries on the code stack 103/203 corresponding to these trampolines; the code stack entries may comprise the trampoline code.

Figure 4:
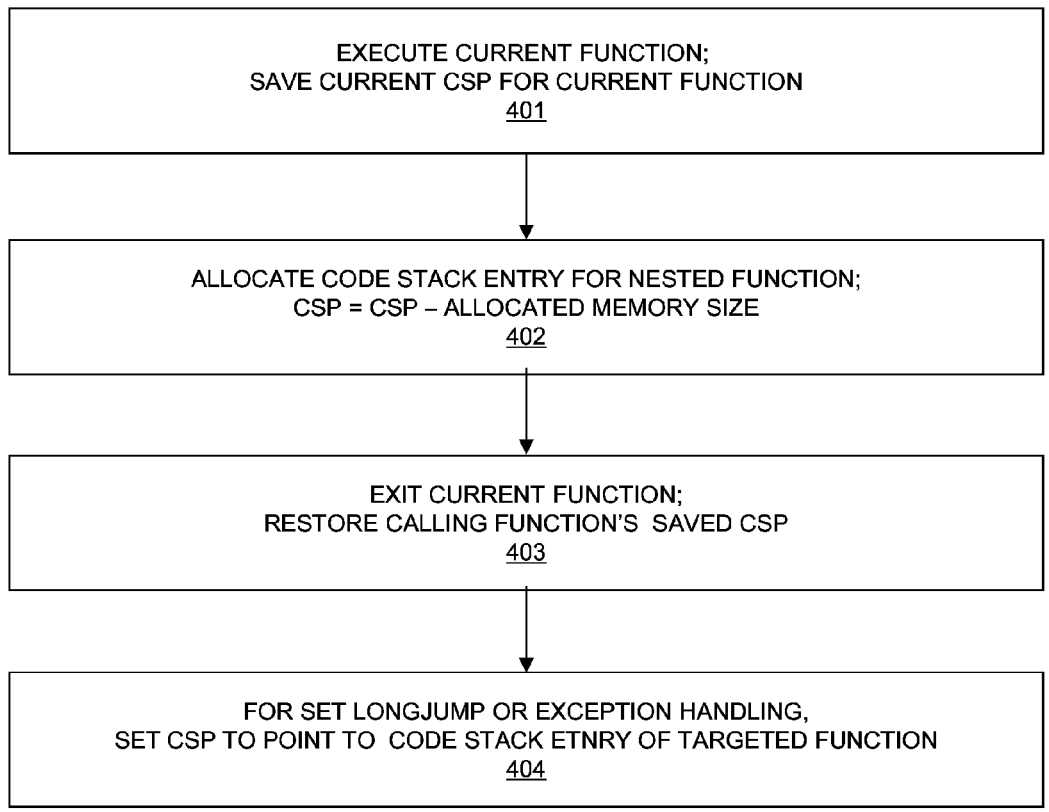
FIGS. 4-5 depict process flows for code stack management in accordance with various embodiments.

FIG. 4 illustrates an embodiment of a method 400 for code stack management. Method 400 is performed in conjunction with an embodiment of computer system 100 that maintains a CSP 205 that points to the most recently added entry in code stack 203 (e.g., code stack entry 204N) and allocation sizes 214. First, in block 401, a current function that may create a code stack entry for use in conjunction with a function pointer for a nested function executes, and the current value of the CSP 205 is saved. The current value of the CSP 205 may be saved in any appropriate memory location. In some embodiments, the saving is performed by storing the current function's CSP on the data stack. In another embodiment, the saving is performed by encoding a correction value in the current function's code in instruction memory, by, for example, a compiler or programmer. Then, in block 402, a code stack entry for use in conjunction with a function pointer to a nested function is allocated on the code stack 203. This is performed by setting the CSP 205 equal to the current value of the CSP 205 minus the size of the allocated memory for the new code stack entry, i.e., CSP<=CSP−allocated memory size, for embodiments in which the code stack 203 grows downwards. In some embodiments, the size of the allocated memory size corresponds to a size of a prepopulated code segment, such as the example code segment that was shown in Table 1A. In some embodiments, code for a trampoline that is used in conjunction with a pointer to a nested function is written into the new code stack entry on the code stack 103/203. The code stack memory area 107 is writeable during allocation of the new code stack entry; in further embodiments, the code stack memory area 107 is not writeable at any other time. In further embodiments, the code stack memory area 107 may also be set to non-executable during allocation of the new code stack entry. The code that is inserted into the code stack entry may comprise a dynamically generated trampoline in some embodiments. In embodiments that comprise prepopulated trampolines, the code stack memory area 107 has been previously initialized to contain the code that is allocated to the new code stack entry, and thus already contains the necessary code in the code stack entry. In further embodiments that include prepopulated trampolines, an associated data area 113 is also allocated in memory 105 for the code stack entry. After allocation of the new code stack entry onto the code stack 103/203, the code stack memory area 107 is set to executable and, in some embodiments, non-writeable.

After allocating the code stack entry on the code stack for use in conjunction with a function pointer to the nested function, the function pointer to the nested function is available for use by the current function during execution of the current function, and all its respective subroutines. In some embodiments, a current function may perform block 402 multiple times, for creating a plurality of pointers to one or more nested functions. In other embodiments, a current function may perform block 402 based on a condition computed at runtime. For example, in some embodiments, the address of the trampoline created in block 402 is assigned to a function pointer. The function pointer may then be used, e.g., in subroutines called from the current function that created the function pointer, allowing the nested function to make reference to the current function's state.

Next, in block 403, the current function exits. All code stack entries belonging to nested functions of the current function are removed from the code stack 103/203. This is performed by setting the CSP 205 equal to the CSP value that was saved in block 401, e.g., moving the CSP 205 up above any code stack entries that were created in block 402. In some embodiments the CSP 205 is restored from a memory location in which it was saved to in block 401; in some embodiments, that memory location is located on the data stack. In other embodiments, the CSP 205 is restored by computing the old CSP, for example, by adding, in embodiments in which the code stack grows downward, or subtracting, in embodiments in which the code stack grows upward, the cumulative allocation sizes 214 that were allocated by the present function during the execution of one or more instances of block 402 from the current value of the CSP 205. In some embodiments, the adjustment factor is tangibly embodied in the instruction sequence.

In some embodiments, instead of the function exit as described with respect to block 403, an alternate exit from the current function is performed in block 404. A function or multiple functions may be simultaneously exited by, for example, structured exception handling, or setjump( )/longjump( ). In some embodiments, if the current function that has allocated at least one code stack entry is exited as part of a control transfer across such multiple levels due to a longjump or exception handling situation, the CSP 205 is set to point to the code stack entry that was targeted by the jump or exception handing situation. In one embodiment, a jmp_buf is extended to include a value to restore the CSP, as shown below in Table 4.

TABLE 4

Example longjump/exception handling code

```
typedef struct {
    void *__pc;      /* program counter */
    void *__sp;      /* stack pointer */
    void *__csp;     /* NEW: CSP */
    int __flags;     /* flags */
    long __regs[16]; /* actual use is architecture dependent */
} jmp_buf[1];
```

In further embodiments of block 404 that include a structured exception handler, unwind information is extended to restore the CSP 205 during unwinding of the data stack, wherein stack frames are removed consecutively from the data stack. In some embodiments, during stack unwinding, the CSP is restored based on an indicator that indicates the presence of a saved CSP value in the unwind tables and contains information indicating the location of the CSP (e.g., in a location in a data stack frame). In various embodiments, the CSP is saved in a general purpose register, an address register, a special purpose register, or a memory location.

Figure 5:
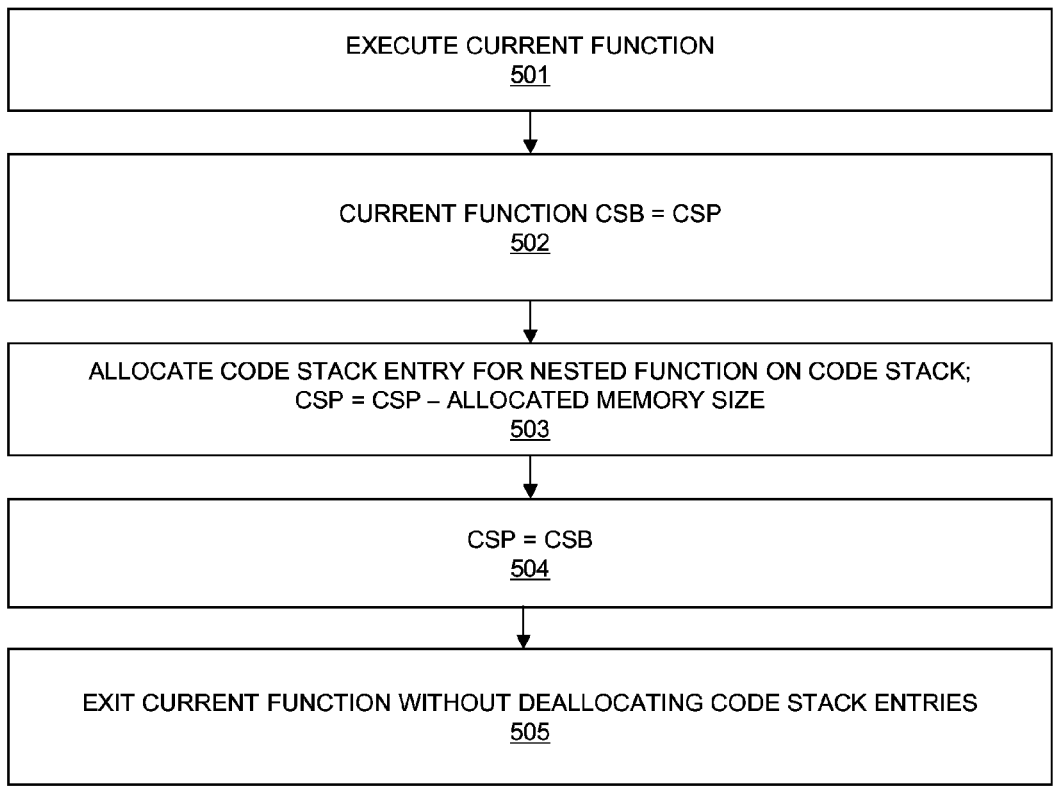

FIG. 5 illustrates another embodiment of a method 500 for code stack management. Method 500 is performed in conjunction with an embodiment of computer system 100 that maintains a CSP 205 and CSBs 213. First, in block 501, a current function executes. Next, in block 502, the current function stores a CSB that is equal to the current CSP 205. Then, in block 503, a code stack entry comprising a trampoline for use in conjunction with a function pointer to a nested function is allocated on the code stack 203, e.g., in a subroutine called by a current function. This is performed by setting the CSP 205 equal to the current value of the CSP 205 minus the size of the allocated memory for the new code stack entry, i.e., CSP<=CSP-allocated memory size, for embodiments in which the code stack 203 grows downwards. In some embodiments, the size of the allocated memory size corresponds to a size of a preallocated code segment, such as the example code fragment that was shown in Table 1A. Code for the trampoline corresponding to a function pointer to a nested function is written into the new code stack entry at the bottom of the code stack 103/203. The code stack memory area 107 is writeable during allocation of the new code stack entry; in further embodiments, the code stack memory area 107 is not writeable at any other time. In further embodiments, the code stack memory area 107 may also be set to non-executable during allocation of the new code stack entry. The code that is inserted into the code stack entry may comprise a dynamically generated trampoline in some embodiments. In embodiments that comprise prepopulated trampolines, the code for the code stack entry has been written to code stack memory area 107 previously. In further embodiments that include prepopulated trampolines, an associated data area 113 is also allocated in memory 105 for the code stack entry. After allocation of the new code stack entry onto the code stack 103/203, the code stack memory area 107 is executable and, in some embodiments, non-writeable.

After allocating the code stack entry on the code stack for a trampoline used in conjunction with a function pointer to the nested function, the function pointer to the nested function is available for use. In some embodiments, a current function may perform block 503 multiple times, for a plurality of nested functions. In other embodiments, a current function may perform block 402 based on a condition computed at runtime. For example, in some embodiments, the address of the trampoline created in block 503 is assigned to a function pointer. The function pointer may then be used, e.g., in further subroutines called from the function that created the function pointer, allowing the nested function to make reference to the surrounding function's state.

In block 504, the saved current function's CSB is explicitly restored into the CSP, thereby deallocating the code stack entries that were allocated by one or more instances of block 503, e.g., in subroutines of the current function. After block 504, block 503 may be repeated one or more times by the current function in some embodiments. Lastly, in block 505, the current function exits without deallocating any code stack entries. Instead, code stack entries are deallocated by the current function by explicitly performing block 504, not in block 505. In some embodiments, a current function does not deallocate its own entries in block 504, but instead, a calling function of the current function performs block 502 prior to calling the current function, and block 504 of the calling function when the present function 505 returns without deallocating code stack entries. During execution of the current function, block 502 is performed to record a CSB, and block 504 is performed to discard all code stack entries beyond the CSB; blocks 502 and 504 may be performed as needed by the current function. The CSB can be stored in various locations, such as the data stack, a general purpose register, or a special purpose register in various embodiments.

Figure 6:
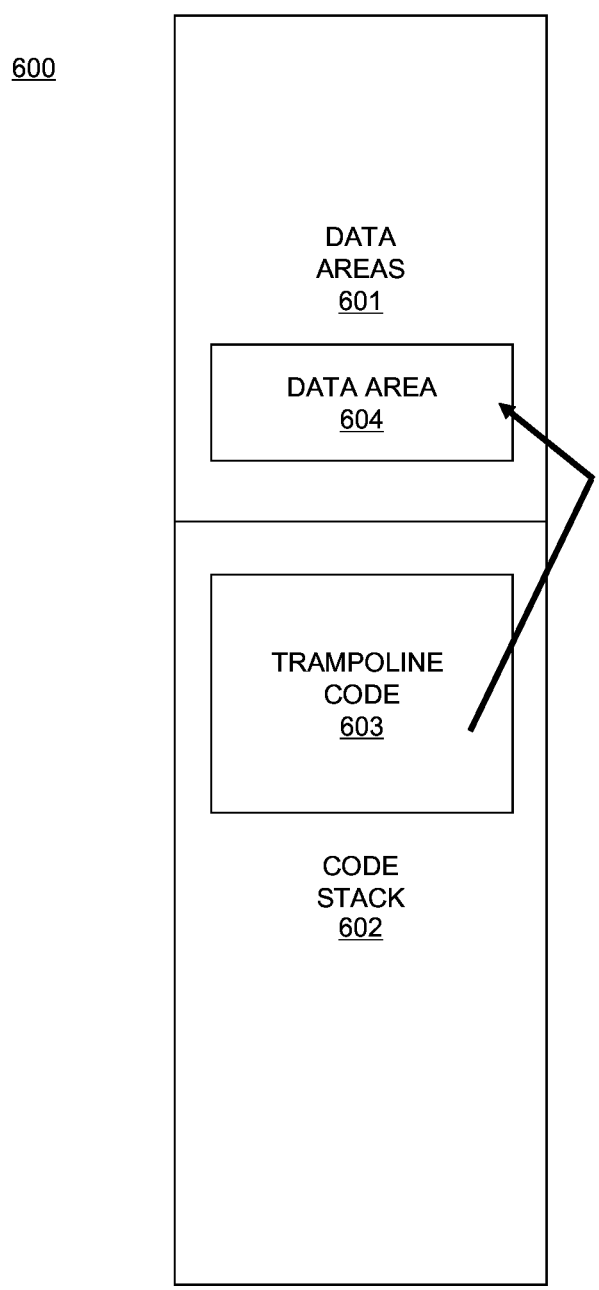
FIG. 6 depicts an embodiment of a data areas and a code stack.

FIG. 6 illustrates an embodiment of a system 600 including data areas such as data areas 113 of FIG. 1 that are used in conjunction with a code stack. System 600 includes data areas 601 and a code stack 602. Code stack 602 includes a plurality of code stack entries; one of the code stack entries on code stack 602 comprises trampoline code 603. Trampoline code 603 references a respective data area 604 in data areas 601. Data area 604 may hold a static chain value and a function entry address, as shown in conjunction with the example trampoline code of Tables 1A and 1B. In addition, the data area 604 may hold other information, such any information shown with respect to the code stack header 212 of FIG. 2C, e.g., an allocation size 214 and/or a pointer 215 to an associated data stack frame corresponding to a function that allocated the code stack entry that comprises trampoline code 603. The data areas 601 as shown in FIG. 6 may grow upwards, and the code stack 602 as shown in FIG. 6 may grow downwards; however, this is shown for illustrative purposes only.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 7:
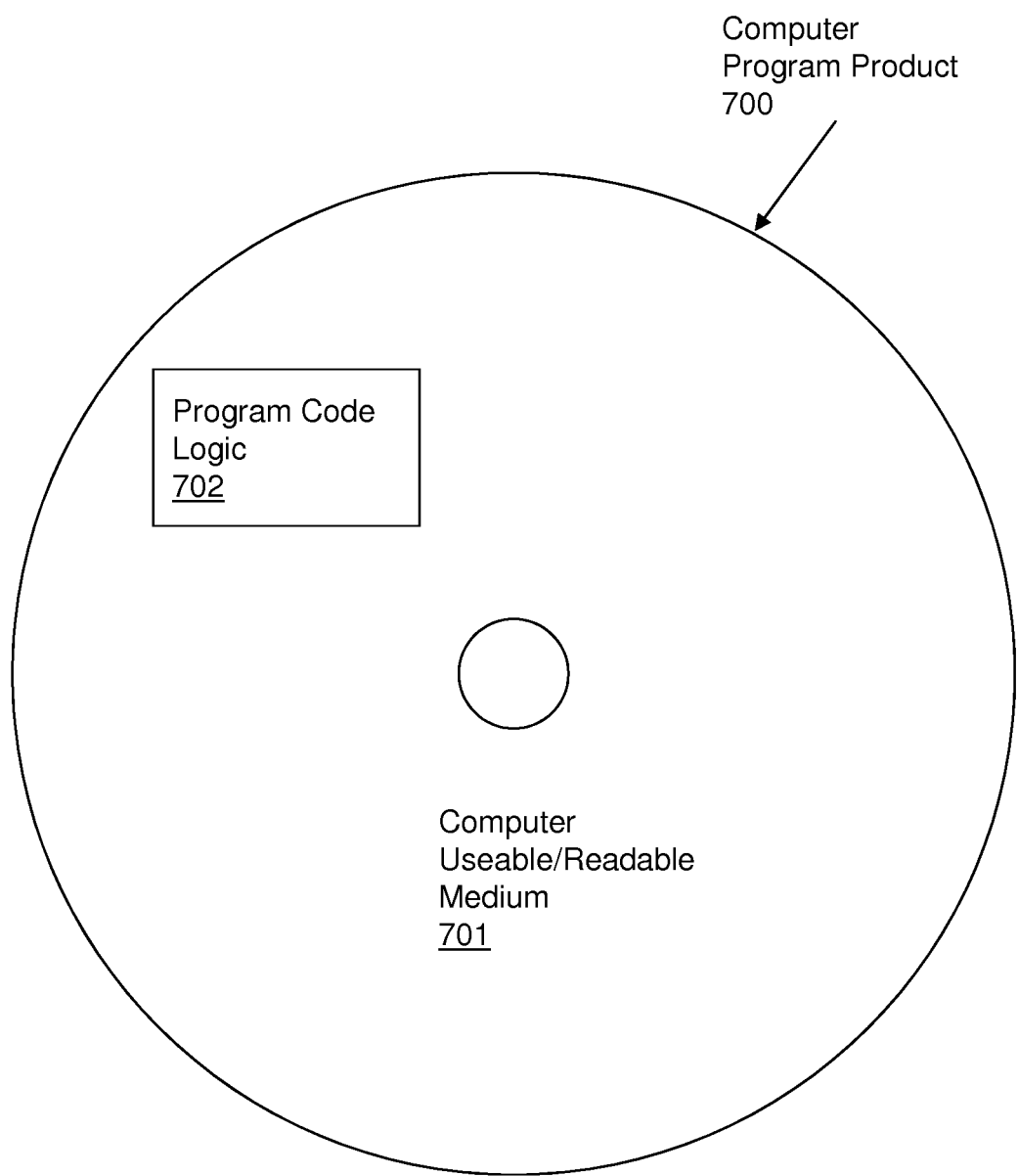
FIG. 7 illustrates a computer program product in accordance with an embodiment.

Referring to FIG. 7, one or more aspects of embodiments can be included in an article of manufacture (e.g., one or more computer program products 700) having, for instance, computer readable storage media 701. The media has embodied therein, for instance, computer readable program code (instructions) 702 to provide and facilitate the capabilities of embodiments. The article of manufacture can be included as a part of a computer system or as a separate product.

An embodiment may be a computer program product for enabling processor circuits to perform elements of the invention, the computer program product comprising a computer readable storage medium readable by a processing circuit and storing instructions for execution by the processing circuit for performing a method. The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as a latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing code stack management, the computer program product comprising:

a non-transitory tangible storage medium readable by a processing circuit and storing instructions for execution by the processing circuit for performing a method comprising:

executing a software application by a processor of a computer;

maintaining a data stack in a data stack memory area of a memory of the computer, the data stack comprising a plurality of stack frames comprising one or more data variables corresponding to the execution of the software application;

maintaining a code stack in a code stack memory area of the memory of the computer, the code stack comprising a plurality of code stack entries comprising executable computer code corresponding to the execution of the software application, the code stack memory area being separate from the data stack memory area;
entering a function of the software application;
storing a current value of a code stack pointer (CSP) of the code stack in a memory location for the function on the data stack based on entering the function;
allocating one or more entries on the code stack corresponding to a trampoline used in conjunction with a pointer to one or more nested functions of the function, wherein a most recently allocated code stack entry is referenced by the CSP; and
before exiting the function, restoring the CSP by loading the stored CSP value from the memory location.

2. The computer program product of claim 1, the data stack memory area being writeable and non-executable, and the code stack memory area being executable.

3. The computer program product of claim 1, the method further comprising:
setting the code stack memory area to writeable and non-executable before allocation of a new code stack entry onto the code stack; and
setting the code stack memory area to executable and non-writeable after allocation of the new code stack entry onto the code stack.

4. The computer program product of claim 1, the method further comprising:
determining a value of a pointer to an associated stack frame of a most recent code stack entry in the code stack, wherein a most recently allocated code stack entry is referenced by the CSP of the code stack;
determining whether the pointer to the associated stack frame references a valid stack frame in the data stack;
based on determining that the pointer to the associated stack frame does not reference a valid stack frame in the data stack, deallocating the most recent code stack entry from the code stack; and
based on determining that the pointer to the associated stack frame references a valid stack frame in the data stack, allocating a new code stack entry on the code stack, and setting the CSP to reference the new code stack entry.

5. The computer program product of claim 1, the method further comprising:
entering a function of the software application;
allocating one or more code stack entries on the code stack corresponding to one or more nested functions of the function, wherein a most recently allocated code stack entry is referenced by the CSP; and
before exiting the function, restoring the CSP by removing a total memory size that was allocated for the one or more code stack entries from the CSP.

6. The computer program product of claim 1, a code stack entry comprising:
code corresponding to a dynamically generated trampoline used in conjunction with a pointer to a nested function of the software application; and
a pointer to a stack frame associated with the code stack entry, the pointer referencing the associated stack frame in the data stack.

7. The computer program product of claim 1, the method further comprising:
storing a value of a CSP of the code stack as a code stack barrier (CSB) of a current function;
allocating a new code stack entry for a trampoline used in conjunction with a pointer to a nested function; and
setting a CSP of the code stack to reference the new code stack entry; and
setting the CSP equal to the CSB to deallocate the new code stack entry from the code stack before exiting the current function.

8. A computer-implemented method for code stack management, the method comprising:
executing a software application by a processor of a computer;
maintaining a data stack in a data stack memory area of a memory of the computer, the data stack comprising a plurality of stack frames comprising one or more data variables corresponding to the execution of the software application;
maintaining a code stack in a code stack memory area in the memory of the computer, the code stack comprising a plurality of code stack entries comprising executable computer code corresponding to the execution of the software application, the code stack memory area being separate from the data stack memory area;
storing a value of a code stack pointer (CSP) of the code stack as a code stack barrier (CSB) of a current function;
allocating a new code stack entry for a trampoline used in conjunction with a pointer to a nested function; and
setting the CSP of the code stack to reference the new code stack entry; and
setting the CSP equal to the CSB to deallocate the new code stack entry from the code stack before exiting the current function.

9. The method of claim 8, the data stack memory area being writeable and non-executable, and the code stack memory area being executable.

10. The method of claim 8, further comprising:
setting the code stack memory area to writeable and non-executable before allocation of a new code stack entry onto the code stack; and
setting the code stack memory area to executable and non-writeable after allocation of the new code stack entry onto the code stack.

11. The method of claim 8, further comprising:
determining a value of a pointer to an associated stack frame of a most recent code stack entry in the code stack, wherein a most recently allocated code stack entry is referenced by a code stack pointer (CSP) of the code stack;
determining whether the pointer to the associated stack frame references a valid stack frame in the data stack;
based on determining that the pointer to the associated stack frame does not reference a valid stack frame in the data stack, deallocating the most recent code stack entry from the code stack; and
based on determining that the pointer to the associated stack frame references a valid stack frame in the data stack, allocating a new code stack entry on the code stack, and setting the CSP to reference the new code stack entry.

12. The method of claim 8, a code stack entry comprising:
code corresponding to a dynamically generated trampoline used in conjunction with a pointer to a nested function of the software application; and
a pointer to a stack frame associated with the code stack entry, the pointer referencing the associated stack frame in the data stack.

13. A system, comprising:
a processor in communication with one or more types of memory, the processor configured to:
execute a software application by a processor of a computer;

maintain a data stack in a data stack memory area of a memory of the computer, the data stack comprising a plurality of stack frames comprising one or more data variables corresponding to the execution of the software application;

maintain a code stack in a code stack memory area of the memory of the computer, the code stack comprising a plurality of code stack entries comprising executable computer code corresponding to the execution of the software application, the code stack memory area being separate from the data stack memory area;

store a value of a code stack pointer (CSP) of the code stack as a code stack barrier (CSB) of a current function;

allocate a new code stack entry for a trampoline used in conjunction with a pointer to a nested function; and set the CSP of the code stack to reference the new code stack entry; and set the CSP equal to the CSB to deallocate the new code stack entry from the code stack before exiting the current function.

14. The system of claim 13, wherein the data stack memory area is writeable and non-executable, and the code stack memory area is executable.

15. The system of claim 13, wherein the processor is further configured to:
set the code stack memory area to writeable and non-executable before allocation of a new code stack entry onto the code stack; and
set the code stack memory area to executable and non-writeable after allocation of the new code stack entry onto the code stack.

16. The system of claim 13, wherein the processor is further configured to:
determine a value of a pointer to an associated stack frame of a most recent code stack entry in the code stack, wherein a most recently allocated code stack entry is referenced by the CSP of the code stack;
determine whether the pointer to the associated stack frame references a valid stack frame in the data stack;
based on a determination that the pointer to the associated stack frame does not reference a valid stack frame in the data stack, deallocate the most recent code stack entry from the code stack; and
based on a determination that the pointer to the associated stack frame references a valid stack frame in the data stack, allocate a new code stack entry on the code stack, and setting the CSP to reference the new code stack entry.

17. The system of claim 13, wherein the processor is further configured to:
entering a function of the software application;
storing a current value of a CSP of the code stack in a memory location for the function on the data stack based on entering the function;
allocating one or more entries on the code stack corresponding to a trampoline used in conjunction with a pointer to one or more nested functions of the function, wherein a most recently allocated code stack entry is referenced by the CSP; and
before exiting the function, restoring the CSP by loading the stored CSP value from the memory location.

18. The system of claim 13, wherein the processor is further configured to:
enter a function of the software application;
allocate one or more code stack entries on the code stack corresponding to one or more nested functions of the function, wherein a most recently allocated code stack entry is referenced by the CSP; and
before exiting the function, restore the CSP by removing a total memory size that was allocated for the one or more code stack entries from the CSP.

19. The system of claim 13, wherein a code stack entry comprises:
code corresponding to a dynamically generated trampoline used in conjunction with a pointer to a nested function of the software application; and
a pointer to a stack frame associated with the code stack entry, the pointer referencing the associated stack frame in the data stack.

* * * * *